(12) United States Patent
Lin et al.

(10) Patent No.: US 8,824,252 B2
(45) Date of Patent: Sep. 2, 2014

(54) SIGNAL CLAMPING DEVICE AND METHOD THEREOF AND RELATED OPTICAL STORAGE SYSTEM

(75) Inventors: Jia-Hau Lin, Tai-Chung Hsien (TW); Chih-Chung Wu, Pingtung County (TW); Hung-Yen Chen, Taipei (TW); Hao-Hui Yin, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 588 days.

(21) Appl. No.: 11/864,915

(22) Filed: Sep. 29, 2007

(65) Prior Publication Data
US 2009/0086590 A1    Apr. 2, 2009

(51) Int. Cl.
*G11B 7/002* (2006.01)
*G11B 7/09* (2006.01)
*G11B 7/12* (2012.01)

(52) U.S. Cl.
CPC ............ *G11B 7/0908* (2013.01); *G11B 7/1201* (2013.01)
USPC ..................................................... 369/44.17

(58) Field of Classification Search
None
See application file for complete search history.

(56) References Cited

U.S. PATENT DOCUMENTS

| | | | |
|---|---|---|---|
| 5,631,891 A * | 5/1997 | Moritsugu et al. ........ | 369/124.11 |
| 5,708,378 A * | 1/1998 | Horie et al. ................... | 327/102 |
| 5,831,949 A | 11/1998 | Kim | |
| 6,075,762 A * | 6/2000 | Watanabe .................. | 369/53.27 |
| 6,700,427 B1 * | 3/2004 | Sherman ...................... | 327/309 |
| 7,940,857 B2 * | 5/2011 | Pajukoski .................... | 375/296 |
| 2002/0140844 A1 * | 10/2002 | Kurokawa et al. ............ | 348/362 |
| 2005/0135214 A1 * | 6/2005 | Tsai et al. .................... | 369/53.3 |
| 2005/0185093 A1 * | 8/2005 | Nashida ....................... | 348/558 |
| 2005/0213454 A1 | 9/2005 | Huang | |

FOREIGN PATENT DOCUMENTS

TW    I246678    1/2006

* cited by examiner

*Primary Examiner* — Joseph Haley
*Assistant Examiner* — Emily Frank
(74) *Attorney, Agent, or Firm* — McClure, Qualey & Rodack, LLP

(57) ABSTRACT

The invention discloses a signal clamping device capable of clamping a signal with a clamp level that is set according to a frequency characteristic of the signal and a method thereof and a related optical storage system. The signal clamping device includes an equalizing unit, a determining unit, and a clamping unit. The equalizing unit is utilized for equalizing the signal and generating an equalized signal. The determining unit is utilized for generating an indication signal according to the equalized signal. The clamping unit is utilized for determining a clamp level according to the indication signal and clamping the signal with the clamp level.

12 Claims, 9 Drawing Sheets

SIGNAL CLAMPING DEVICE AND METHOD THEREOF AND RELATED OPTICAL STORAGE SYSTEM

BACKGROUND

The invention relates to a signal clamping device and a method thereof and a related optical storage system, and more particularly, to a signal clamping device capable of clamping a signal with a variable clamp level that is set according to a frequency characteristic of the signal, and to a method thereof and a related optical storage system.

It is well known that a conventional optical storage system generally includes a conventional focus servo output (FOO) signal clamping device for clamping an FOO signal which has a level exceeding a predetermined clamp level so as to prevent a focus actuator from moving an objective lens in an optical pick-up head of the optical storage system to hit an optical disc. However, the predetermined clamp level is not adjustable, and thus the conventional FOO signal clamping device will result in an over limit problem.

Please refer to FIG. 1. FIG. 1 shows a bode diagram of a lead compensator in a focus compensator of the conventional optical storage system. As shown in FIG. 1, a high frequency component of a FOO signal generated from the lead compensator will have a higher gain, and thus the high frequency FOO signal may tend to be clamped more easily. The high frequency FOO signal may act as accelerating the lens to follow the vibrated disk, not like the low frequency FOO signal which may act as moving lens to a certain position and may hit the optical disk easily. Thus, the FOO signal having a high frequency component sending to the FOO signal clamping device is easily subjected to be improper clamped. Therefore, an efficient and economical solution for preventing the objective lens in the optical pick-up head of the optical storage system from hitting the optical disc without having the over limit problem is eagerly required at present.

SUMMARY OF THE INVENTION

It is therefore one of the objectives of the invention to provide a signal clamping device capable of clamping a signal with a variable clamp level that is set according to a frequency characteristic of the signal and a method thereof and a related optical storage system, so as to solve the above problem.

In accordance with an embodiment of the invention, a signal clamping device for clamping a signal is disclosed. The signal clamping device includes an equalizing unit, a determining unit, and a clamping unit. The equalizing unit is utilized for equalizing the signal and generating an equalized signal. The determining unit is utilized for generating an indication signal according to the equalized signal. The clamping unit is utilized for determining a clamp level according to the indication signal and clamping the signal with the clamp level.

In accordance with an embodiment of the invention, a signal clamping device for clamping a signal is further disclosed. The signal clamping device includes a clamp level generator and a clamping module. The clamp level generator is utilized for generating a specific clamp level according to a frequency characteristic of the signal. The clamping module is utilized for clamping the signal with the specific clamp level.

In accordance with an embodiment of the invention, an optical storage system is yet further disclosed. The optical storage system includes a servo control unit, a signal clamping device, a power driver, and a focus actuator. The servo control unit is utilized for generating a focus servo output (FOO) signal. The signal clamping device is utilized for clamping the FOO signal with a variable clamp level that is set according to a frequency characteristic of the FOO signal. The power driver is utilized for generating a driving signal according to an output signal of the signal clamping device. The focus actuator is utilized for moving an objective lens in an optical pick-up head according to the driving signal.

In accordance with an embodiment of the invention, a signal clamping method for clamping a signal is further disclosed. The signal clamping method includes: equalizing the signal and generating an equalized signal; generating an indication signal according to the equalized signal; determining a clamp level according to the indication signal; and clamping the signal with the clamp level.

In accordance with an embodiment of the invention, a signal clamping method for clamping a signal is yet further disclosed. The signal clamping method includes: generating a specific clamp level according to a frequency characteristic of the signal; and clamping the signal with the specific clamp level.

These and other objectives of the invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . . ." The terms "couple" and "coupled" are intended to mean either an indirect or a direct electrical connection. Thus, if a first device couples to a second device, that connection may be through a direct electrical connection, or through an indirect electrical connection via other devices and connections.

The invention relates to a signal clamping device capable of clamping a signal with a variable clamp level that is set according to a frequency characteristic of the signal and a method thereof. This document will illustrate several exemplary embodiments that apply the signal clamping device and the signal clamping method to an optical storage system. However, a person of skill in the pertinent art should be able to understand that the invention can be applied to various electronic devices and is not limited to the particular embodiments described in the following paragraphs or to the particular manner in which any features of such embodiments are implemented.

In general, the signal clamping device and the signal clamping method of the invention can be applied to all kinds of electronic devices. By way of example but not limitation, the signal clamping device and the signal clamping method applied to an optical storage system are disclosed in this document. However, this is only for an illustration purpose and is not meant to be a limitation of the invention. In addition, under conditions of not affecting the technical disclosure of the invention, the optical storage system will be used in this document as an example to illustrate the operation schemes of the signal clamping device and the signal clamping method according to the invention.

Figure 1:
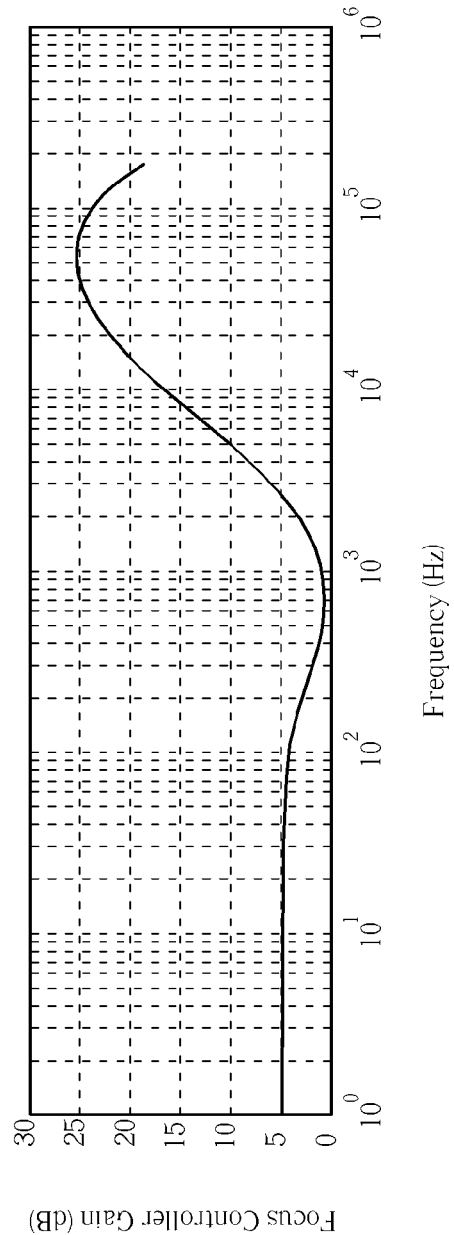
FIG. 1 shows a bode diagram of a lead compensator in a focus compensator of the conventional optical storage system.
Figure 2:
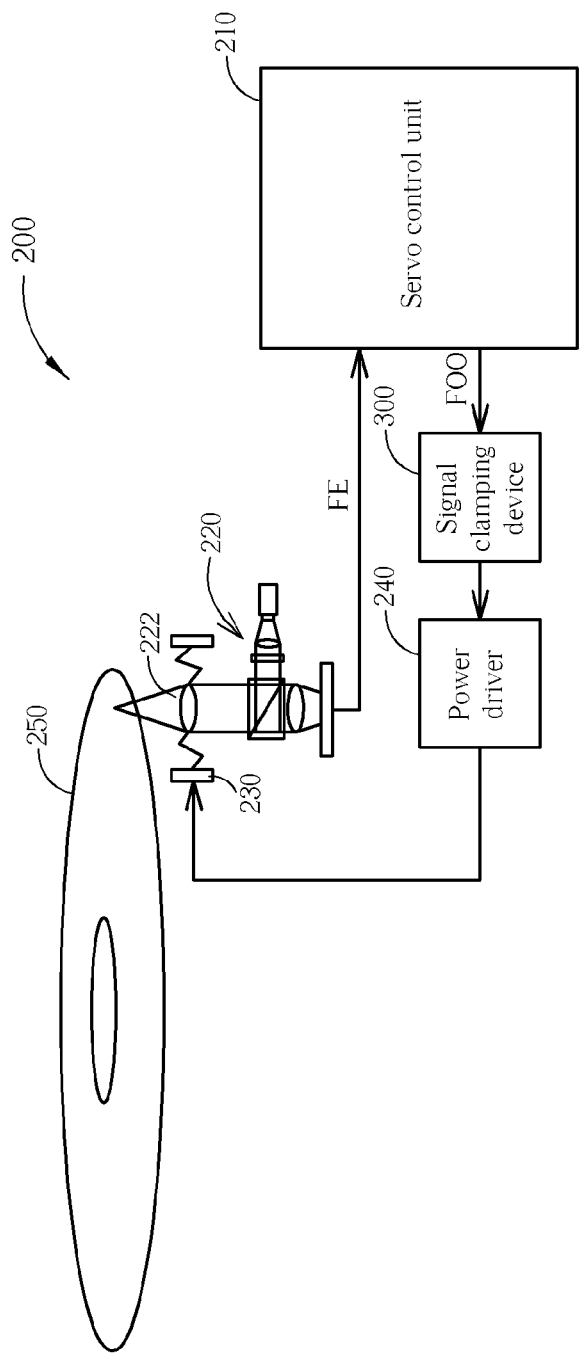
FIG. 2 shows a simplified block diagram of an optical storage system in accordance with an embodiment of the invention.

Please refer to FIG. 2. FIG. 2 shows a simplified block diagram of an optical storage system 200 in accordance with an embodiment of the invention. As shown in FIG. 2, the optical storage system 200 includes a servo control unit 210, a signal clamping device 300, an optical pick-up head 220, a focus actuator 230, and a power driver 240. The servo control unit 210 is utilized for generating a focus servo output (FOO) signal FOO according to a focus error (FE) signal. The signal clamping device 300 is coupled to the servo control unit 210 and utilized for clamping the FOO signal FOO with a variable clamp level that is set according to a frequency characteristic of the FOO signal FOO. The optical pick-up head 220 is utilized for accessing data recorded on an optical medium 250. The focus actuator 230 is utilized for moving an objective lens 222 in the optical pick-up head 220. The power driver 240 is coupled to the focus actuator 230 and utilized for receiving an output signal of the signal clamping device 300 and generating a driving signal for driving the focus actuator 230 according to the output signal.

Figure 3:
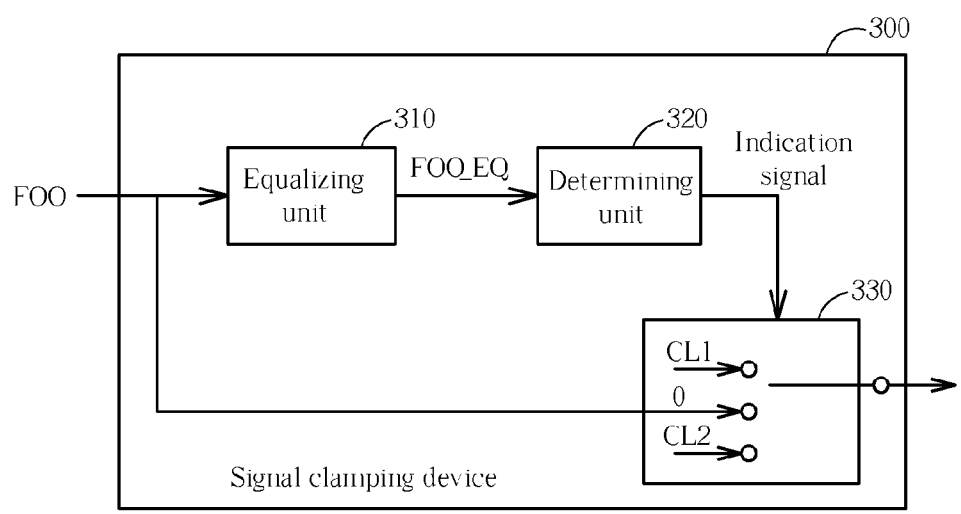
FIG. 3 shows a simplified block diagram of the signal clamping device for clamping the FOO signal in the optical storage system 200 in accordance with a first embodiment of the invention.

Please refer to FIG. 3. FIG. 3 shows a simplified block diagram of the signal clamping device 300 for clamping the FOO signal FOO in accordance with a first embodiment of the invention. As shown in FIG. 3, the signal clamping device 300 includes an equalizing unit 310, a determining unit 320, and a clamping unit 330. The equalizing unit 310 is utilized for receiving the FOO signal FOO and generating an equalized FOO signal FOO_EQ. The determining unit 320 is coupled to the equalizing unit 310 and utilized for generating an indication signal according to the equalized FOO signal FOO_EQ. The clamping unit 330 is coupled to the determining unit 320 and utilized for determining a clamp level according to the indication signal and for clamping the signal with the clamp level.

Figure 4:
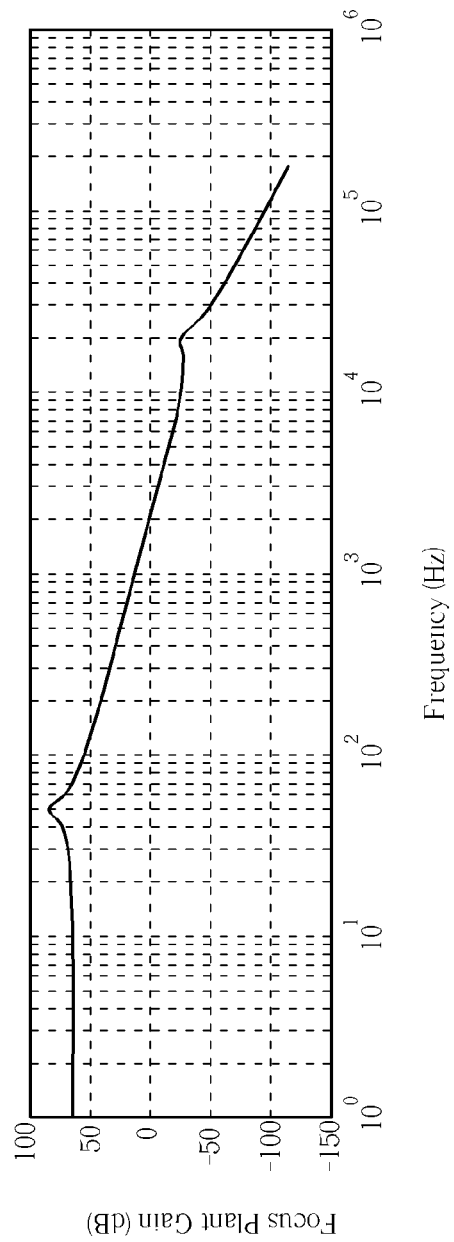
FIG. 4 shows a bode diagram of the focus actuator.

Please refer to FIG. 3 and FIG. 4. FIG. 4 shows a bode diagram of the focus actuator 230. As shown in FIG. 4, when the driving signal inputted to the focus actuator 230 has a high frequency component, the driving force generated from the focus actuator 230 will have a lower gain. In other word, comparing with low frequency FOO signal, the actuator only moves the lens a little distance if the frequency of the FOO signal is high. Thus, the equalizing unit 310 can be a one-order compensator (such as a one-order low pass filter (LPF)) or a two-order compensator (such as a two-order LPF), or the equalizing unit 310 can be an estimator of the focus actuator 230. In this way, the high frequency component of the FOO signal is attenuated by the equalizing unit 310 and the high frequency component of the equalized FOO signal FOO_EQ is much less to exceed the thresholds, the determining unit 320 is capable of generating the indication signal indicating corresponding clamp level by comparing the equalized FOO signal FOO_EQ with a first threshold level TH1 and a second threshold level TH2 lower than the first threshold level TH1. When the equalized FOO signal FOO_EQ is greater than the first threshold level TH1, the determining unit 320 will generate the indication signal to indicate the clamping unit 330 to clamp the FOO signal FOO with a first specific clamp level CL1, and when the equalized FOO signal FOO_EQ is less than the second threshold level TH2, the determining unit 320 will generate the indication signal to indicate the clamping unit 330 to clamp the FOO signal FOO with a second specific clamp level CL2 lower than the first specific clamp level CL1. Herein, please note that the value of the first specific clamp level CL1 is not necessary to be identical to the first threshold level TH1, and the value of the second specific clamp level CL2 is also not necessary to be identical to the second threshold level TH2. In addition, when the equalized FOO signal FOO_EQ is not greater than the first threshold level TH1 and not less than the second threshold level TH2, the determining unit 320 will generate the indication signal to indicate the clamping unit 330 to not clamp the FOO signal FOO. However, please note that the above embodiment is only for an illustration purpose and is not meant to be a limitation of the invention. For example, the determining unit 320 also can generate the indication signal indicating whether to clamp the FOO signal FOO by comparing the equalized FOO signal FOO_EQ with only one threshold level. When the equalized FOO signal FOO_EQ is greater than the threshold level, the determining unit 320 will generate the indication signal to indicate the clamping unit 330 to clamp the FOO signal FOO at a specific clamp level, and when the equalized FOO signal FOO_EQ is not greater than the threshold level, the determining unit 320 will generate the indication signal to indicate the clamping unit 330 to not clamp the FOO signal FOO.

Figure 5:
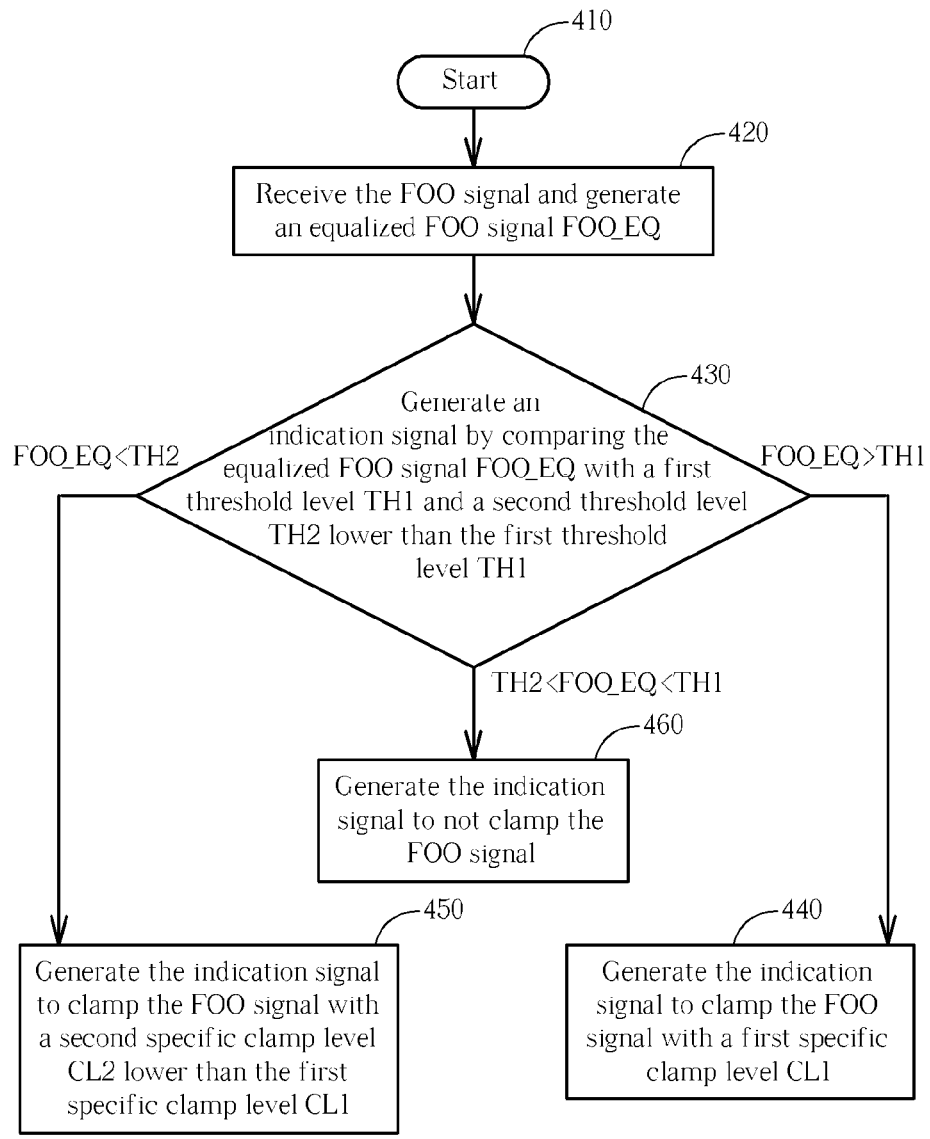
FIG. 5 is a flowchart showing a first embodiment of a signal clamping method for clamping the FOO signal in accordance with the operation schemes of the signal clamping device shown in FIG. 3 of the invention.

FIG. 5 is a flowchart showing a first embodiment of a signal clamping method for clamping the FOO signal FOO in accordance with the operation schemes of the signal clamping device 300 in the above embodiment of the invention. Provided that substantially the same result is achieved, the steps of the process flowchart need not be in the exact order shown and need not be contiguous; that is, other steps can be intermediate. The first embodiment of the signal clamping method applied to the optical storage system 200 in accordance with the invention includes the following steps:

Step 410: Start.

Step 420: Receive the FOO signal and generate an equalized FOO signal FOO_EQ.

Step 430: Generate an indication signal by comparing the equalized FOO signal FOO_EQ with a first threshold level TH1 and a second threshold level TH2 lower than the first threshold level TH1. If the equalized FOO signal FOO_EQ is greater than the first threshold level TH1, then go to Step 440; if the equalized FOO signal FOO_EQ is less than the second threshold level TH2, then go to Step 450; and if the equalized FOO signal FOO_EQ is not greater than the first threshold level TH1 and not less than the second threshold level TH2, then go to Step 460.

Step 440: Generate the indication signal to clamp the FOO signal FOO with a first specific clamp level CL1.

Step 450: Generate the indication signal to clamp the FOO signal FOO with a second specific clamp level CL2 lower than the first specific clamp level CL1.

Step 460: Generate the indication signal to not clamp the FOO signal FOO.

Figure 6:
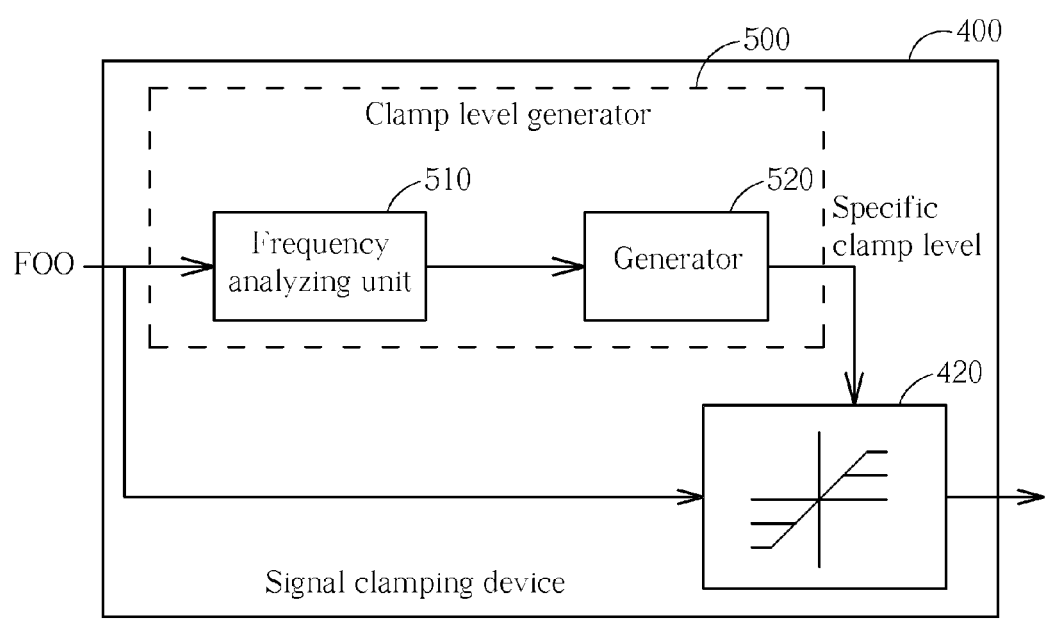
FIG. 6 shows a simplified block diagram of the signal clamping device for clamping the FOO signal in the optical storage system in accordance with a second embodiment of the invention.

FIG. 6 shows a simplified block diagram of the signal clamping device 400 for clamping the FOO signal FOO in the optical storage system 200 in accordance with a second embodiment of the invention. As shown in FIG. 6, the signal clamping device 400 includes a clamp level generator 500 and a clamping module 420. The clamp level generator 500 is utilized for receiving the FOO signal FOO and outputting a specific clamp level according to a frequency characteristic of the FOO signal FOO. The clamping module is coupled to the clamp level generator 500 and utilized for receiving the FOO signal FOO and the specific clamp level, and is utilized to clamp the FOO signal FOO with the received specific clamp level. In the second embodiment of the invention, the clamp level generator 500 further includes a frequency analyzing unit 510 and a generator 520. The frequency analyzing unit 510 is utilized for analyzing the frequency characteristic of the FOO signal FOO to generate a frequency value of the FOO signal FOO. The generator 520 is coupled to the frequency analyzing unit 510 and the clamping module 420, and the generator 520 includes a clamp level formula or a clamp level lookup table (not shown) storing mappings between a plurality of clamp levels and a plurality of frequency values. The generator 520 is utilized for generating the specific clamp level corresponding to the frequency value of the FOO signal FOO for the clamp module 420 according to the clamp level formula or the clamp level lookup table. For example, when the FOO signal FOO has a higher frequency value, the generator 520 will generate a specific clamp level with a wider range according to the clamp level formula or the clamp level lookup table, so as to avoid the over limit problem for the FOO signal FOO. However, please note that the above embodiment is only for an illustration purpose and is not meant to be a limitation of the invention.

Figure 7:
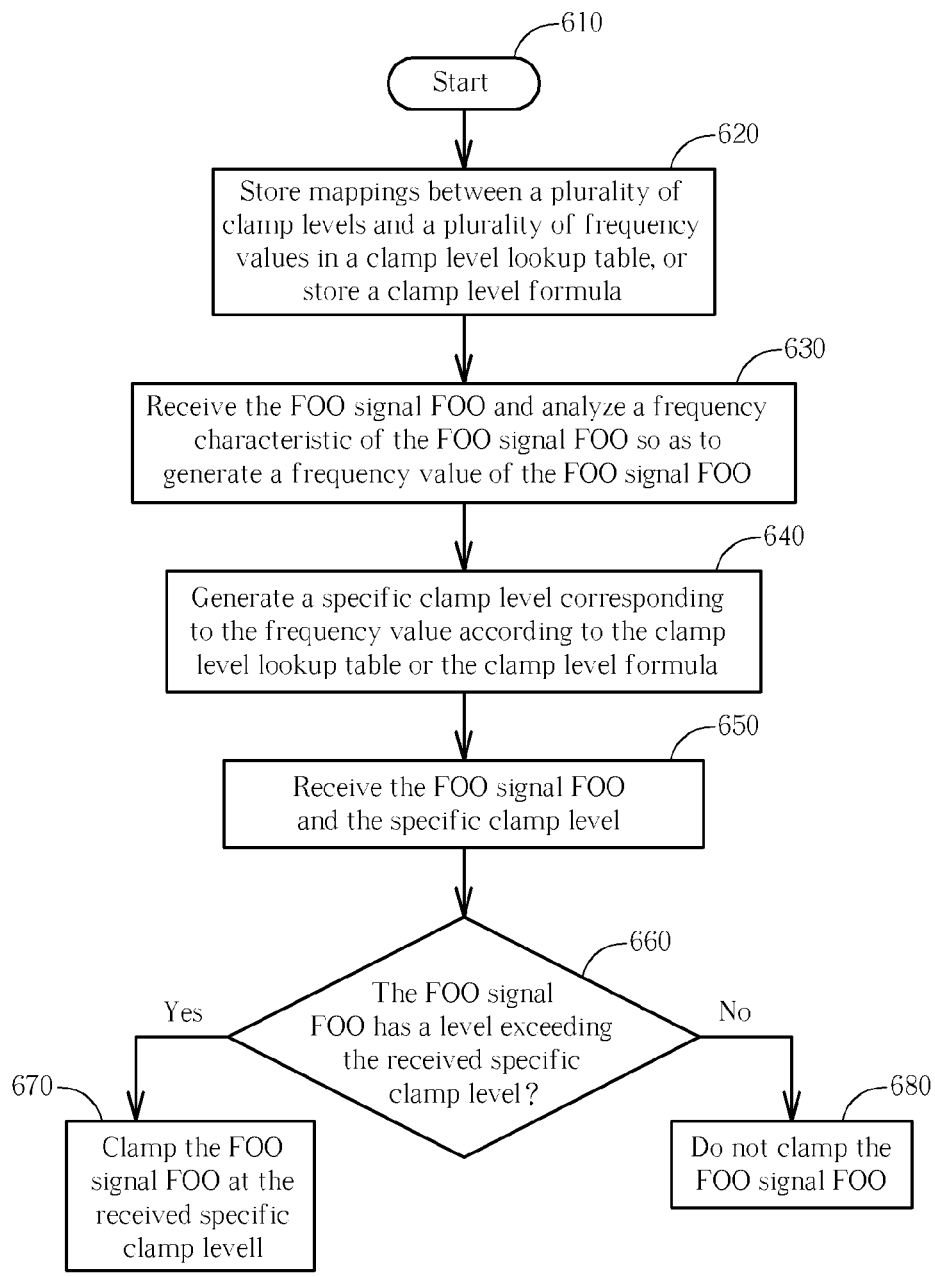
FIG. 7 is a flowchart showing a second embodiment of a signal clamping method for clamping the FOO signal in accordance with the operation schemes of the signal clamping device shown in FIG. 6 of the invention.

FIG. 7 is a flowchart showing a second embodiment of a signal clamping method for clamping the FOO signal FOO in accordance with the operation schemes of the signal clamping device 400 in the above embodiment of the invention. Provided that substantially the same result is achieved, the steps of the process flowchart need not be in the exact order shown and need not be contiguous; that is, other steps can be intermediate. The second embodiment of the signal clamping method applied to the optical storage system 200 in accordance with the invention includes the following steps:

Step 610: Start.

Step 620: Store mappings between a plurality of clamp levels and a plurality of frequency values in a clamp level lookup table, or store a clamp level formula.

Step 630: Receive the FOO signal FOO and analyze a frequency characteristic of the FOO signal FOO so as to generate a frequency value of the FOO signal FOO.

Step 640: Generate a specific clamp level corresponding to the frequency value according to the clamp level lookup table or the clamp level formula.

Step 650: Receive the FOO signal FOO and the specific clamp level.

Step 660: Determine whether to clamp the FOO signal FOO with the received specific clamp level. If the FOO signal FOO has a level exceeding the received specific clamp level, then go to Step 670; otherwise, go to Step 680.

Step 670: Clamp the FOO signal FOO at the received specific clamp level.

Step 680: Do not clamp the FOO signal FOO.

Figure 8:
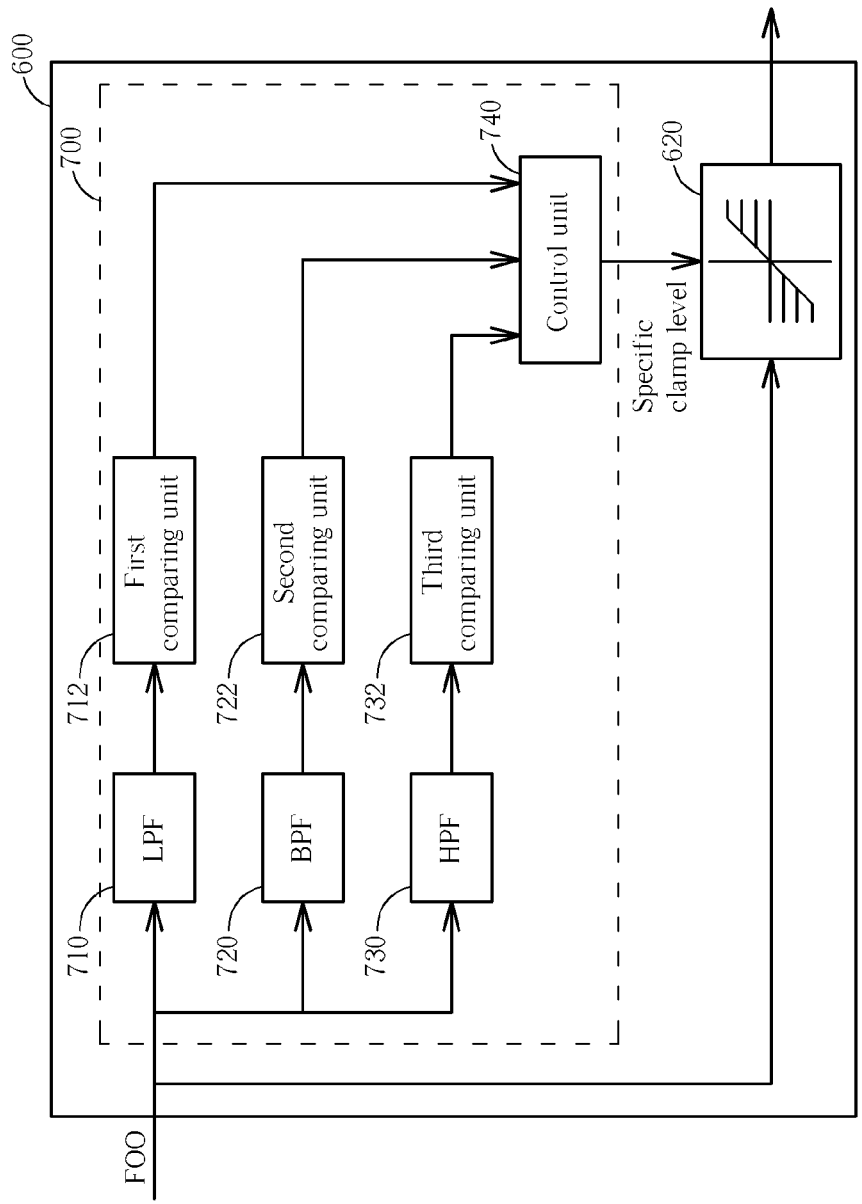
FIG. 8 shows a simplified block diagram of the signal clamping device for clamping the FOO signal in the optical storage system in accordance with a third embodiment of the invention.

Please refer to FIG. 8. FIG. 8 shows a simplified block diagram of the signal clamping device 600 for clamping the FOO signal FOO in the optical storage system 200 in accordance with a third embodiment of the invention. As shown in FIG. 8, the signal clamping device 600 includes a clamp level generator 700 and a clamping module 620. Similar to the second embodiment of the invention, the clamp level generator 700 is utilized for receiving the FOO signal FOO and generating a specific clamp level according to a frequency characteristic of the FOO signal FOO. And the clamping module is coupled to the clamp level generator 700 and utilized for receiving the FOO signal FOO and the specific clamp level and determining whether to clamp the FOO signal FOO according to the received specific clamp level. In the third embodiment of the invention, the clamp level generator 700 includes a low pass filter (LPF) 710, a first comparing unit 712, a band pass filter (BPF) 720, a second comparing unit 722, a high pass filter (HPF) 730, a third comparing unit 732, and a control unit 740. The LPF 710 is utilized for receiving the FOO signal FOO and filtering the FOO signal FOO to generate a first filtered signal. The first comparing unit 712 is coupled to the LPF 710 and utilized for comparing the first filtered signal with a first threshold level TH1 and generating a first clamp level. The BPF 720 is utilized for receiving the FOO signal FOO and filtering the FOO signal FOO to generate a second filtered signal. The second comparing unit 722 is coupled to the BPF 720 and utilized for comparing the second filtered signal with a second threshold level TH2 and generating a second clamp level. The HPF 730 is utilized for receiving the FOO signal FOO and filtering the FOO signal FOO to generate a third filtered signal. The third comparing unit 732 is coupled to the HPF 730 and utilized for comparing the third filtered signal with a third threshold level and generating a third clamp level. The control unit 740 is coupled to the first comparing unit 712, the second comparing unit 722, the third comparing unit 732, and the clamping module 620. The control unit 740 is utilized for selecting a lowest clamp level of the first clamp level, the second clamp level, and the third clamp level. And the control unit 740 outputs the selected lowest clamp level as the specific clamp level.

For example, when the first clamp level, the second clamp level, and the third clamp level respectively generated from the first comparing unit 712, the second comparing unit 722, and the third comparing unit 732, the control unit 740 selects a lowest clamp level of the first clamp level, the second clamp level, and the third clamp level (for example the first clamp level) as the specific clamp level so as to prevent the focus actuator 230 from moving the objective lens 222 in the optical pick-up head 220 of the optical storage system 200 to hit the optical medium 250 without having the over limit problem. Please refer to FIG. 4 again. As shown in FIG. 4, when the driving signal inputted to the focus actuator 230 has a lower frequency component, the driving force generated from the focus actuator 230 will have a higher gain, and thus the control unit 740 selects a lowest clamp level of the first clamp level, the second clamp level, and the third clamp level as a specific claim level. However, please note that the above embodiment is only for an illustration purpose and is not meant to be a limitation of the invention.

Figure 9:
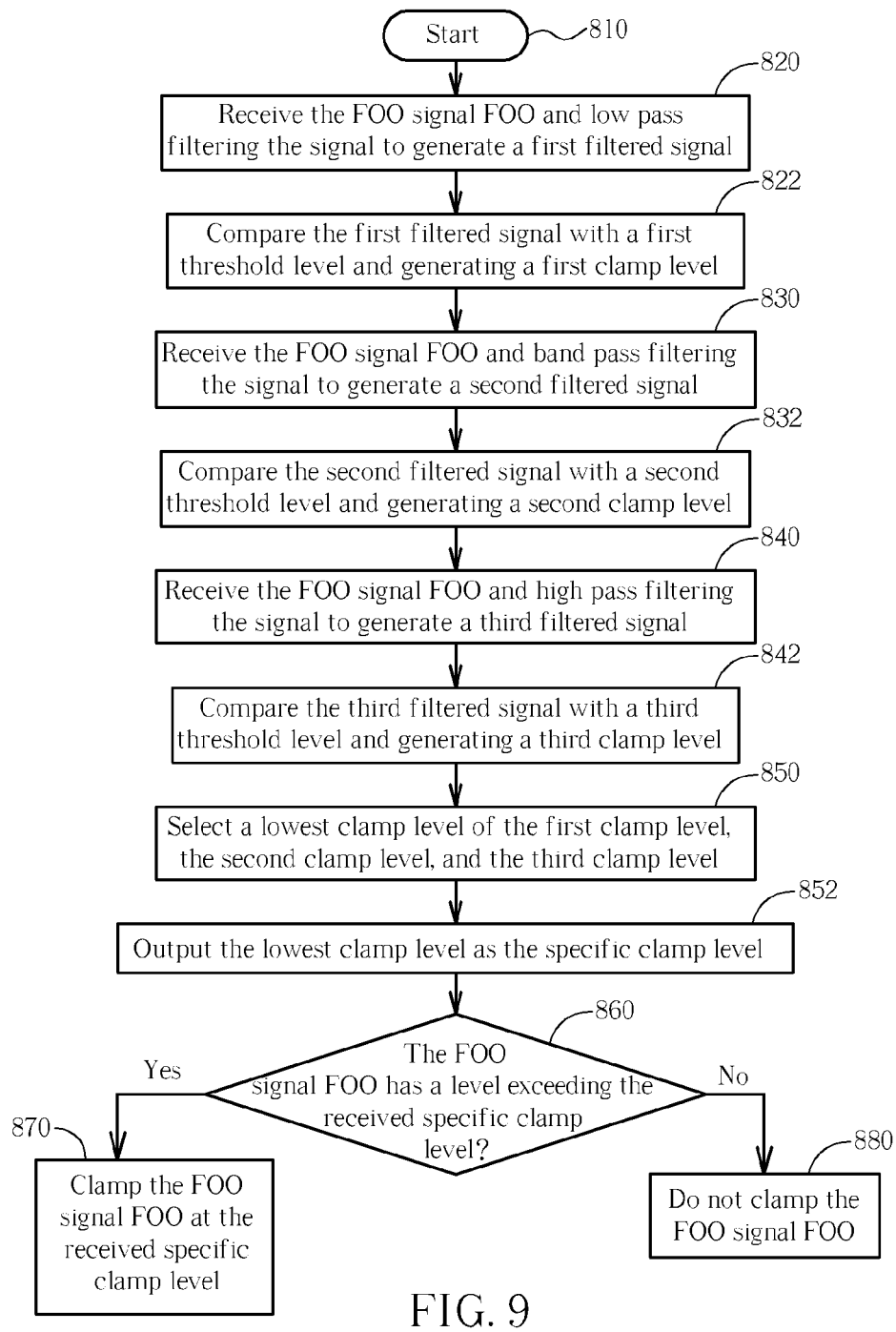
FIG. 9 is a flowchart showing a third embodiment of a signal clamping method for clamping the FOO signal in accordance with the operation schemes of the signal clamping device shown in FIG. 8 of the invention.

FIG. 9 is a flowchart showing a third embodiment of a signal clamping method for clamping the FOO signal FOO in accordance with the operation schemes of the signal clamping device 600 in the above embodiment of the invention. Provided that substantially the same result is achieved, the steps of the process flowchart need not be in the exact order shown and need not be contiguous; that is, other steps can be intermediate. The third embodiment of the signal clamping method applied to the optical storage system 200 in accordance with the invention includes the following steps:

Step 810: Start.
Step 820: Receive the FOO signal FOO and low pass filtering the signal to generate a first filtered signal.
Step 822: Compare the first filtered signal with a first threshold level and generating a first clamp level.
Step 830: Receive the FOO signal FOO and band pass filtering the signal to generate a second filtered signal.
Step 832: Compare the second filtered signal with a second threshold level and generating a second clamp level.
Step 840: Receive the FOO signal FOO and high pass filtering the signal to generate a third filtered signal.
Step 842: Compare the third filtered signal with a third threshold level and generating a third clamp level.
Step 850: Select a lowest clamp level of the first clamp level, the second clamp level, and the third clamp level.
Step 852: Output the lowest clamp level as the specific clamp level.
Step 860: Determine whether to clamp the FOO signal FOO according to the received specific clamp level. If the FOO signal FOO has a level exceeding the received specific clamp level, then go to Step 870; otherwise, go to Step 880.
Step 870: Clamp the FOO signal FOO at the received specific clamp level.
Step 880: Do not clamp the FOO signal FOO.

Briefly summarized, the signal clamping device and the signal clamping method for clamping the FOO signal FOO disclosed by the invention are obviously capable of preventing the focus actuator 230 from moving the objective lens 222 in the optical pick-up head 220 of the optical storage system 200 to hit the optical medium 250 without having the over limit problem mentioned above.

Those skilled in the art will readily observe that numerous modifications and alterations of the device and method may be made while retaining the teachings of the invention.

What is claimed is:

1. A signal clamping device for clamping a signal, the signal clamping device comprising:
 a clamp level generator for receiving the signal and generating a specific clamp level according to a frequency of the signal; and
 a clamping module for receiving the signal and clamping the signal with the specific clamp level, wherein the specific clamp level is varied according to the frequency of the signal.

2. The signal clamping device of claim 1, wherein the clamp level generator comprises:
 a frequency analyzing unit receiving the signal, for analyzing the frequency of the signal to generate a frequency value of the signal; and
 a generator, coupled to the frequency analyzing unit and the clamping module, for generating the specific clamp level corresponding to the frequency value of the signal according to a clamp level lookup table or a clamp level formula.

3. The signal clamping device of claim 1, wherein the clamp level generator comprises:
 a low pass filter (LPF), for filtering the signal to generate a first filtered signal;
 a first comparing unit, for comparing the first filtered signal with a first threshold level and generating a first clamp level;
 a band pass filter (BPF), for filtering the signal to generate a second filtered signal;
 a second comparing unit, for comparing the second filtered signal with a second threshold level and generating a second clamp level;
 a high pass filter (HPF), for filtering the signal to generate a third filtered signal;
 a third comparing unit, for comparing the third filtered signal with a third threshold level and generating a third clamp level; and
 a control unit, for outputting a lowest clamp level of the first clamp level, the second clamp level, and the third clamp level as the specific clamp level.

4. A signal clamping method for clamping a signal, the signal clamping method comprising:
 receiving the signal and generating a specific clamp level according to a frequency of the signal; and receiving the signal and clamping the signal with the specific clamp level, wherein the specific clamp level is varied according to the frequency of the signal.

5. The signal clamping method of claim 4, wherein the step of generating the specific clamp level according to the frequency of the signal further comprises:
 analyzing the frequency of the signal to generate a frequency value of the signal; and
 generating the specific clamp level corresponding to the frequency value of the signal according to a clamp level lookup table or a clamp level formula.

6. The signal clamping method of claim 4, wherein the step of generating the specific clamp level according to the frequency of the signal further comprises:
 filtering the signal with a low pass filter to generate a first filtered signal;
 comparing the first filtered signal with a first threshold level and generating a first clamp level;
 filtering the signal with a band pass filter to generate a second filtered signal;
 comparing the second filtered signal with a second threshold level and generating a second clamp level;
 filtering the signal with a high pass filter to generate a third filtered signal;
 comparing the third filtered signal with a third threshold level and generating a third clamp level; and
 outputting a lowest clamp level of the first clamp level, the second clamp level, and the third clamp level as the specific clamp level.

7. A signal clamping device for clamping a signal, the signal clamping device comprising:
 a clamp level generator for receiving the signal and generating a specific clamp level according to a frequency of the signal; and
 a clamping module for receiving the signal;
 wherein the clamping module outputs the signal if a level of the signal does not exceed the specific clamp level, wherein the specific clamp level is varied according to the frequency of the signal.

8. The signal clamping device of claim 7, wherein the clamping module outputs an output signal with the specific clamp level if the level of the signal exceeds the specific clamp level.

9. The signal clamping device of claim 7, wherein the clamp level generator comprises:
- a frequency analyzing unit receiving the signal, for analyzing the frequency of the signal to generate a frequency value of the signal; and
- a generator, coupled to the frequency analyzing unit and the clamping module, for generating the specific clamp level corresponding to the frequency value of the signal according to a clamp level lookup table or a clamp level formula.

10. A signal clamping method for clamping a signal, the signal clamping method comprising:
- receiving the signal and generating a specific clamp level according to a frequency of the signal; and
- outputting the signal if a level of the signal does not exceed the specific clamp level, wherein the specific clamp level is varied according to the frequency of the signal.

11. The signal clamping method of claim 10 further comprising:
- outputting an output signal with the specific clamp level if the level of the signal exceeds the specific clamp level.

12. The signal clamping method of claim 10, wherein the step of generating the specific clamp level according to the frequency of the signal further comprises:
- analyzing the frequency of the signal to generate a frequency value of the signal; and
- generating the specific clamp level corresponding to the frequency value of the signal according to a clamp level lookup table or a clamp level formula.

\* \* \* \* \*